US012704935B2

(12) United States Patent
Raymond et al.

(10) Patent No.: US 12,704,935 B2
(45) Date of Patent: Aug. 11, 2026

(54) METHOD FOR INTERACTION WITH A USER OF AN IMMERSIVE SYSTEM AND DEVICE FOR IMPLEMENTING SUCH A METHOD

(71) Applicant: IMMERSION, Bordeaux (FR)

(72) Inventors: Félix Raymond, Bordeaux (FR); Grégoire De La Riviere, Le Bouscat (FR)

(73) Assignee: IMMERSION, Bordeaux (FR)

( * ) Notice: Subject to any disclaimer, the term of this patent is extended or adjusted under 35 U.S.C. 154(b) by 0 days.

(21) Appl. No.: 17/755,499

(22) PCT Filed: Oct. 27, 2020

(86) PCT No.: PCT/FR2020/051937
§ 371 (c)(1),
(2) Date: Apr. 29, 2022

(87) PCT Pub. No.: WO2021/084198
PCT Pub. Date: May 6, 2021

(65) Prior Publication Data

US 2022/0374133 A1 Nov. 24, 2022

(30) Foreign Application Priority Data

Oct. 29, 2019 (FR) ...................................... 1912120

(51) Int. Cl.
*G06F 3/04815* (2022.01)
*G06F 3/01* (2006.01)
(Continued)

(52) U.S. Cl.
CPC .......... *G06F 3/04815* (2013.01); *G06F 3/011* (2013.01); *G06F 3/04812* (2013.01);
(Continued)

(58) Field of Classification Search
None
See application file for complete search history.

(56) References Cited

U.S. PATENT DOCUMENTS

| | | | | |
|---|---|---|---|---|
| 11,024,079 B1 * | 6/2021 | Chuah | ...................... | G06T 7/246 |
| 2013/0201214 A1 * | 8/2013 | Piippo | .................. | G06F 3/1423<br>345/619 |

(Continued)

OTHER PUBLICATIONS

Gauglitz, S. et al. (Oct. 2014). World-stabilized annotations and virtual scene navigation for remote collaboration. In Proceedings of the 27th annual ACM symposium on User interface software and technology (pp. 449-459). Retrieved Aug. 21, 2023 from https://dl.acm.org/doi/pdf/10.1145/2642918.2647372 (Year: 2014).*

(Continued)

*Primary Examiner* — Linda Huynh
(74) *Attorney, Agent, or Firm* — Perman & Green, LLP

(57) ABSTRACT

A method for interaction between at least one operator user of an immersive system, including an operator interface, and at least one expert user of an assistance system including an expert interface and a pointing tool for interacting with the operator interface. The expert interface displaying a visual depiction of a field of view of the immersed operator user and including a main window having regions for interpret a pointing action in two different ways. The method includes the expert user: orienting the operator user's gaze by introducing an orientation marker into the operator user's field of view by performing a pointing action with the pointing tool on the expert interface, and providing an indication of movement to the operator by introducing a movement marker into the operator user's field of view with a pointing action on the expert interface. An immersive collaborative device is also provided.

27 Claims, 5 Drawing Sheets

(51) Int. Cl.
*G06F 3/04812* (2022.01)
*G06F 3/04842* (2022.01)
*G06F 3/04845* (2022.01)
*G06T 19/20* (2011.01)

(52) U.S. Cl.
CPC ...... *G06F 3/04842* (2013.01); *G06F 3/04845* (2013.01); *G06T 19/20* (2013.01)

(56) References Cited

U.S. PATENT DOCUMENTS

| | | | | |
|---|---|---|---|---|
| 2015/0109336 | A1* | 4/2015 | Hayakawa | G06F 18/21 345/633 |
| 2016/0275760 | A1* | 9/2016 | Block | G07F 19/203 |
| 2016/0314759 | A1* | 10/2016 | Shin | G09G 5/006 |
| 2016/0358383 | A1* | 12/2016 | Gauglitz | G06F 3/0304 |
| 2018/0218538 | A1* | 8/2018 | Short | G06V 20/20 |
| 2019/0133689 | A1* | 5/2019 | Johnson | G09B 9/00 |
| 2019/0139313 | A1 | 5/2019 | De La Riviere et al. | |
| 2019/0243599 | A1* | 8/2019 | Rochford | G06F 3/147 |
| 2019/0304188 | A1* | 10/2019 | Bridgeman | G09B 5/14 |
| 2019/0317974 | A1 | 10/2019 | Chamberlin et al. | |
| 2019/0355181 | A1* | 11/2019 | Srinivasan | G06T 19/20 |
| 2019/0370544 | A1* | 12/2019 | Wright, Jr. | G06T 7/20 |
| 2020/0043354 | A1* | 2/2020 | Ha | H04N 7/141 |
| 2020/0394012 | A1* | 12/2020 | Wright, Jr. | G06F 3/005 |
| 2021/0096726 | A1* | 4/2021 | Faulkner | G06F 3/04842 |

OTHER PUBLICATIONS

International search report for PCT/FR2020/051937 dated Feb. 5, 2021.

* cited by examiner

METHOD FOR INTERACTION WITH A USER OF AN IMMERSIVE SYSTEM AND DEVICE FOR IMPLEMENTING SUCH A METHOD

CROSS-REFERENCE TO RELATED APPLICATIONS

This application is a National Stage of International Application No. PCT/FR2020/051937, having an International Filing Date of 27 Oct. 2020, which designated the United States of America, and which International Application was published under PCT Article 21(2) as WO Publication No. 2021/084198 A1, which claims priority from and the benefit of French Patent Application No. 1912120, filed on 29 Oct. 2019, the disclosures of which are incorporated herein by reference in their entireties.

BACKGROUND

Field

The present disclosure relates to the field of immersive and collaborative technologies.

More particularly, the present disclosure relates to the field of collaboration between virtual reality or augmented reality users and viewers of said users.

Brief Description of Related Developments

Virtual reality and augmented reality software tools allow visualizing an ideally 3D virtual environment that may include an object, a set of objects and/or a complete set of elements capable of creating a virtual world.

To support several devices and therefore several collaborators, it is known to carry out on each of the devices:

- a duplication of the database;
- an installation of the same software;
- an opening of this software;
- a transmission and a synchronization of information relating to the parameters of the world (for example interfaces), the state of the elements describing the world (for example 3D transformations) and the state of the different collaborators (for example position and orientation of their respective cameras);
- an update of the state of the world, a visualization of the 3D data, and a virtual depiction (for example avatars) of the other collaborators.

Unlike virtual reality tools, augmented reality tools allow filming the physical environment and embed digital information therein. Thus, augmented reality tools are also used in remote assistance contexts in which all known software use the same solutions:

- the operator (user who has the augmented reality device) looks at the environment;
- the expert (viewer remote user) is most often on a conventional personal device, for example of the PC or tablet type and sees the field of view of the operator;
- the operator and the expert launch two different software programs for the same solution, an expert software and an operator software, which software presents different functionalities to each user;
- thanks to the expert software, the expert has access to an interface presenting to him a display of the field of view of the operator and enabling him to activate a free annotation mode (i.e. surround an object in the display of the environment of the operator) or a symbolic annotation mode (i.e. place symbols in the display of the environment of the operator), these free or symbolic annotations being embedded in the real environment of the operator by the operator software.

Conventionally, to send a free or symbolic annotation in the real environment of the operator, the following steps are implemented:

- activating an “annotation” mode by the expert on the expert software;
- pausing, or “freezing” the flow of the operator’s vision on the expert software so that he could carry out an annotation accurately on a fixed reference frame (without suffering from changes of viewpoints or tremors of the operator, a person constantly moving his head, voluntarily or not);
- drawing (free annotation) and/or placing symbols (symbolic annotation) by the expert in the “frozen” two-dimensional vision of the field of view of the operator;
- sending annotations to the system of the operator then displaying these annotations on a plane positioned in the environment of the operator.

The approaches hereinabove have the following drawbacks:

- in the case of a symmetrical collaborative approach according to which the virtual environment is known both by the application of the operator and by the application of the expert, and according to which the interactions and interfaces are common to the devices of the operator and the expert (with some adaptations, for example the interfaces of a native virtual reality application are adapted to the 2D devices of a conventional computer where appropriate), the capabilities of interaction with the environment are very considerable but the capabilities of collaboration with the other users is very limited because there is no tool dedicated to this collaboration;
- in the case of an asymmetrical collaborative approach of remote assistance, dedicated to collaboration, and according to which the environment of the operator is not known to the expert software, the absence of knowledge of the virtual environment leads to carry out simpler interactions such as annotations, but the embedding of these annotations in the real environment, carried out for the operator by the operator application, is based on a determined number of assumptions and simplifications which make embedding of the annotations made inaccurate as soon as the operator gets away from the viewpoint according to which they have been made by the expert.

Moreover, all known solutions allow making annotations only in what the operator user sees and none of the known solutions enables the expert user to guide the operator user’s gaze towards an element that is not located in his field of view.

SUMMARY

The present disclosure allows solving the drawbacks of the prior art and allows, in a single interface, both complete guidance, i.e. possibly towards an element outside its field of view, and accurate, i.e. not impacted by the movements of the virtual reality or augmented reality operator user.

The present disclosure relates to a method for interaction between at least one operator user of an immersive system, said operator user being immersed in an immersion environment a depiction of which he views on an operator interface, and at least one expert user of an assistance system including an expert interface and at least one pointing tool for interacting with the operator interface, said expert interface displaying a visual depiction of the field of view of the immersed operator user and including a main window divided into at least two distinct contiguous regions allowing interpreting a pointing action in at least two different manners. According to the present disclosure, the method comprises an orientation step during which the expert user orients the operator user's gaze by making at least one orientation marker appear in his field of view by carrying out at least one pointing action by means of the at least one pointing tool on the expert interface, in order to attract his attention to a region of interest of the immersion environment, a movement step during which the expert user provides an indication of movement to the operator user by making at least one movement marker appear in his field of view by carrying out at least one pointing action on the expert interface.

In one implementation, during the orientation step, the expert user makes the orientation marker appear by carrying out the pointing action, over a peripheral region of the expert interface.

In one implementation, the orientation marker remains visible in the field of view of the operator user as long as the expert user carries out the pointing action.

In one implementation, the orientation marker disappears automatically within a predefined time period after the expert user has stopped the pointing action.

In one implementation, the orientation marker is updated in real time according to the pointing action carried out by the expert user.

In one implementation, during the movement step, a planar guide is determined by the assistance system, based on a coordinate system provided by the immersive system and on the assumption that a floor of the immersion environment is at a guide height in said coordinate system, said planar guide being displayed on the expert interface to enable the expert user to carry out the at least one pointing action.

In one implementation, the guide height is dynamically adjustable by the expert user.

In one implementation, the planar guide is a grid or a transparent plane or a textured plane.

In one implementation, the planar guide is displayed on the operator interface.

In one implementation, during the movement step the expert user proceeds with a plurality of pointing actions in order to make a trajectory appear in the field of view of the operator user.

In one implementation, during the movement step a depiction of the field of view of the operator user on the expert interface is frozen.

In one implementation, a movement marker created during the movement step disappears after a time period of one to five seconds after the expert user has stopped the pointing action having led to the creation of said marker.

In one implementation, the method according to the present disclosure also comprises a highlighting step during which the expert user attracts the operator user's attention to a particular element of his field of view by means of at least one highlight marker created by carrying out a one-time pointing action.

In one implementation, the highlight marker is displayed in the field of view of the operator user for a period of less than one second.

In one implementation, the method according to the present disclosure also comprises a first annotation step, during which the expert user makes at least one annotation marker appear in the field of view of the operator user.

In one implementation, during the first annotation step, a depiction of the field of view of the operator is frozen on the expert interface.

In one implementation, the at least one annotation marker is displayed in the field of view of the operator user for a period of less than one second.

In one implementation, the method according to the present disclosure also includes a second annotation step during which the expert user makes complementary annotation markers appear in the field of view of the operator user.

In one implementation, during the second annotation step a depiction of the field of view of the operator user on the expert interface is frozen.

In one implementation, the depiction of the field of view of the operator user is frozen as long as the expert user does not voluntarily leave this annotation mode and/or as long as a predefined freezing time period has not elapsed and/or as long as the operator user does not voluntarily leave this mode.

In one implementation, a new window is displayed on the expert interface to display the real-time view of the operator user.

The present disclosure also relates to a collaborative immersion device comprising an immersive system, an assistance system, data transmission means between said immersive system and said assistance system, the immersive an operator software application system including implementing an operator interface and a digital processing system, the assistance system including an expert software application implementing an expert interface and a digital processing system, said expert interface displaying a visual depiction of a field of view of an operator user immersed in said immersive system. According to the present disclosure, the collaborative immersion device also includes at least one pointing tool and the expert interface includes a main window divided into at least two distinct contiguous regions allowing interpreting a pointing action in at least two different manners, depending on whether this pointing action is carried out in either one of the at least two distinct regions, to make at least one orientation marker and at least one movement marker appear on the operator interface.

In one embodiment, the digital processing system of the immersive system and the digital processing system of the assistance system form a single and unique digital processing system.

In one embodiment, at least one of the at least two distinct regions is blurred on the expert interface.

In one embodiment, the main window includes two distinct regions, a rectangular-shaped central region, placed in the center of said main window, and a peripheral region surrounding said central region.

In one embodiment, a pointing action in the central region makes a marker appear on the operator interface, and a pointing action in the peripheral region makes a marker or an annotation appear.

In one embodiment, the expert interface includes at least one interface element allowing modifying the interpretation of a pointing action in at least one of the at least two regions.

In one embodiment, the at least one pointing tool includes a mouse or a touch surface.

DETAILED DESCRIPTION

In the description, the 2D and 3D abbreviations are used instead of the expressions "two dimensions" and "three dimensions".

Figure 1:
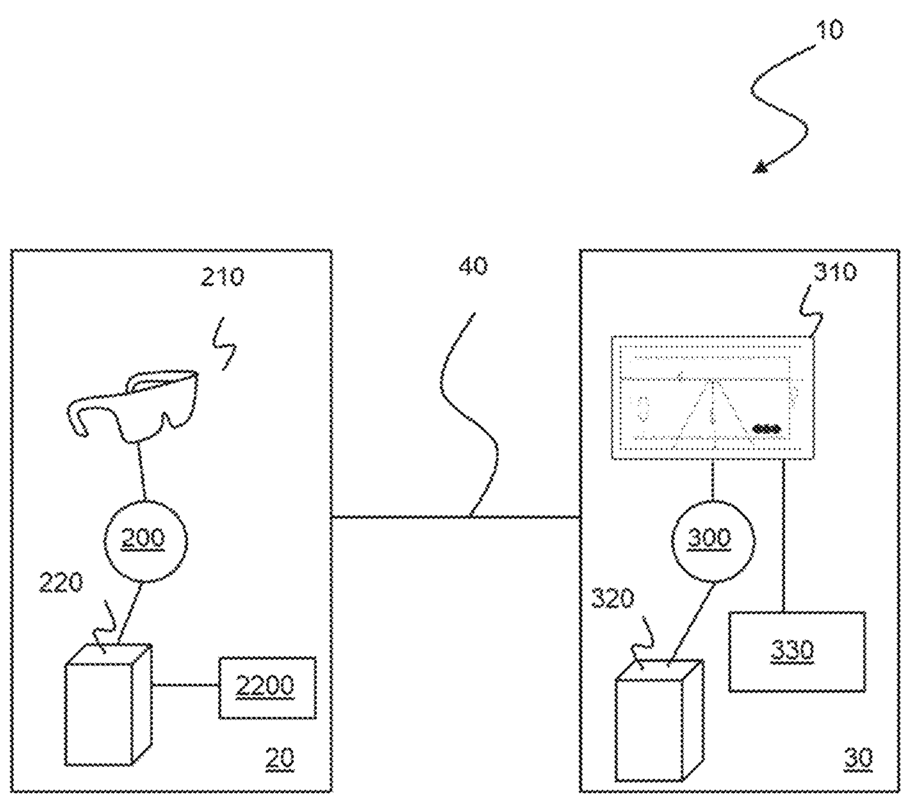
FIG. 1 represents a collaborative immersion device according to the present disclosure.

FIG. 1 illustrates a collaborative immersion device 10 including an immersive system 20 and an assistance system 30, respectively used by an operator user ("operator" in the description) and a spectator user ("expert" in the description).

In general, the immersive system 20 and the assistance system 30 are interconnected by data transmission means 40. If these are remote, said systems could be linked for example by a network connection.

Advantageously, the immersive system 20 and the assistance system 30 could share the same central unit.

The immersive system 20 and the assistance system 30 are respectively associated with an operator software application 200 and an expert software application 300 respectively implementing an operator interface 210 and an expert interface 310.

The immersive system 20 is a known system including a digital processing system 220 including a database 2200 of digital information describing an immersion environment; the operator interface 210 is adapted to display images generated by the digital processing system 220.

By "immersion environment", it should be understood an environment viewed by the operator by means of the immersive system. Depending on the nature of the immersive system, it may consist of a virtual environment (virtual reality), a real environment (for example retransmission of images captured by a camera), or a mixed environment (augmented reality or mixed reality).

By "virtual environment", it should be understood an environment determined by a set of digital data defining the characteristics of this environment and necessary for building a visual depiction of this environment as it should be perceived by a user or an observer of the immersive system.

By "immersive system", it should be understood a system intended to restore sensory impressions to a user in real-time by means of stimulation adapted to the sensations to be restored. In general, the immersive system includes a set of hardware and software means for at least: building an immersive environment from information contained in a database; computing a visual depiction of this immersion environment; displaying images to at least one user;

measuring the position and the direction of observation of the user in a repository of display means on which the images are viewed by the user; the displayed images being computed so as to represent the immersion environment as it should be perceived by the user according to his conditions of observation of the immersion environment.

The immersive system 20 could be a virtual reality system as well as an augmented or mixed reality system.

In practice, the digital processing system 220 is a computer, with a power adapted to real-time image computations, on which synthetic image computing software is executed.

The database 2200 includes all of the specific data defining the immersion environment and necessary for the computation of a visual depiction of said immersion environment, for example data defining geometric shapes of objects, colors of said objects.

The database 2200 also includes data relating to the immersive system itself, in particular parameters relating to the operator interface 210, including geometric data, for example dimensions or positions.

In particular, the digital processing system 220 receives an observation position and an observation direction from the operator in a reference frame of a real environment in which he moves. The observation position and the observation direction in this reference frame are transmitted to the assistance system 30 via the data transmission means 40.

It is important to note that, in the context of the present disclosure, the digital information describing the immersion environment and comprised in the database 2200 of the immersive system 20 are only known to said immersive system, in particular, the assistance system 30 is not aware of the digital information describing the immersion environment.

The assistance system 30 also includes a digital processing system 320 and a pointing tool 330, for example a mouse, a touchpad, a trackball or a touch surface.

The immersive system 20 may for example be a display headset, and the assistance system 30 may for example be a computer, a tablet, a smartphone.

The expert interface 310 includes a main window 311 representing the field of view of the operator immersed in an immersion environment. Depending on the technology and/or the data, and as specified hereinabove, this environment may be exclusively virtual, exclusively real, or a mixture of real and virtual elements. The depiction of the field of view of the operator in the expert interface 310 takes into account a zoom level which could be static (i.e. constant) or dynamically adjustable by the expert software application 300 and/or by the expert.

Figure 2:
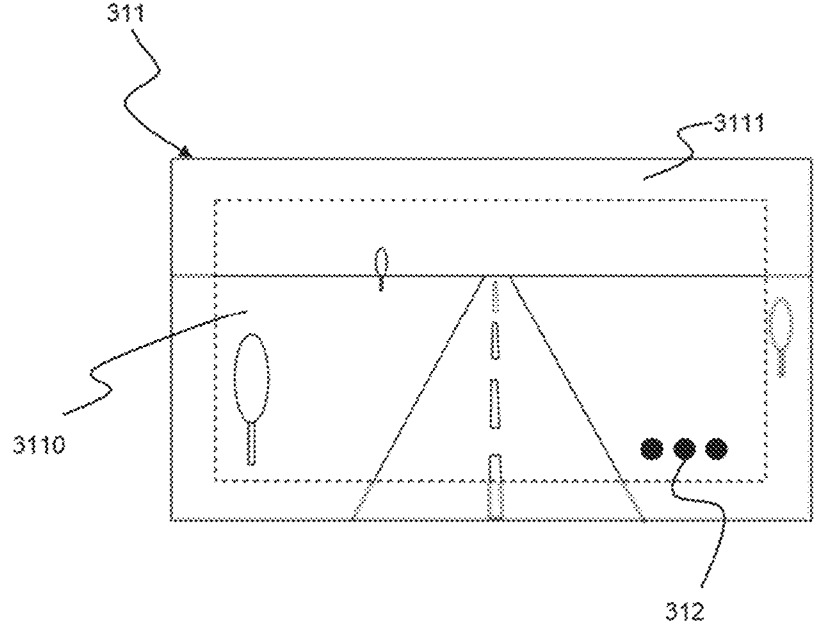
FIG. 2 represents a main window of an expert interface.

Referring to FIG. 2, the main window 311 is divided into two regions: a peripheral region 3111 extending continuously over a portion of the main window from a boundary of said window, and a central region 3110 complementary to said peripheral region.

The border between these regions, represented in FIG. 2 by a broken line, is not necessarily materialized on the expert interface 310 and the two regions are not necessarily visually different from each other.

In the embodiment of FIG. 2, the main window has a rectangular shape and the peripheral area is in the form of a frame. Advantageously, the peripheral region may be graphically represented on the main window 311 by a blur and/or a line delimiting said peripheral region. A person skilled in the art should understand that the central 3110 and peripheral 3111 regions are not limited to these shapes, and could have other geometries, for example the central region 3110 may have an elliptical shape, or a generally rectangular shape with rounded corners. One of the regions may be discontinuous, for example a first portion of the peripheral region 3111 may be located at the center of the main window 311, surrounded by the central region 310, but be functionally associated with a second portion of the peripheral region 3111 located at the periphery of said main window and surrounding the central region 310.

In a known manner, the expert interface 310 may include interface elements 312 for example such as buttons, or such as a blur on the periphery to symbolize the peripheral vision of the operator. These interface elements 312 may be associated with the peripheral region 3111, with the central region 3110, or substantially straddling these two regions.

Figure 3:
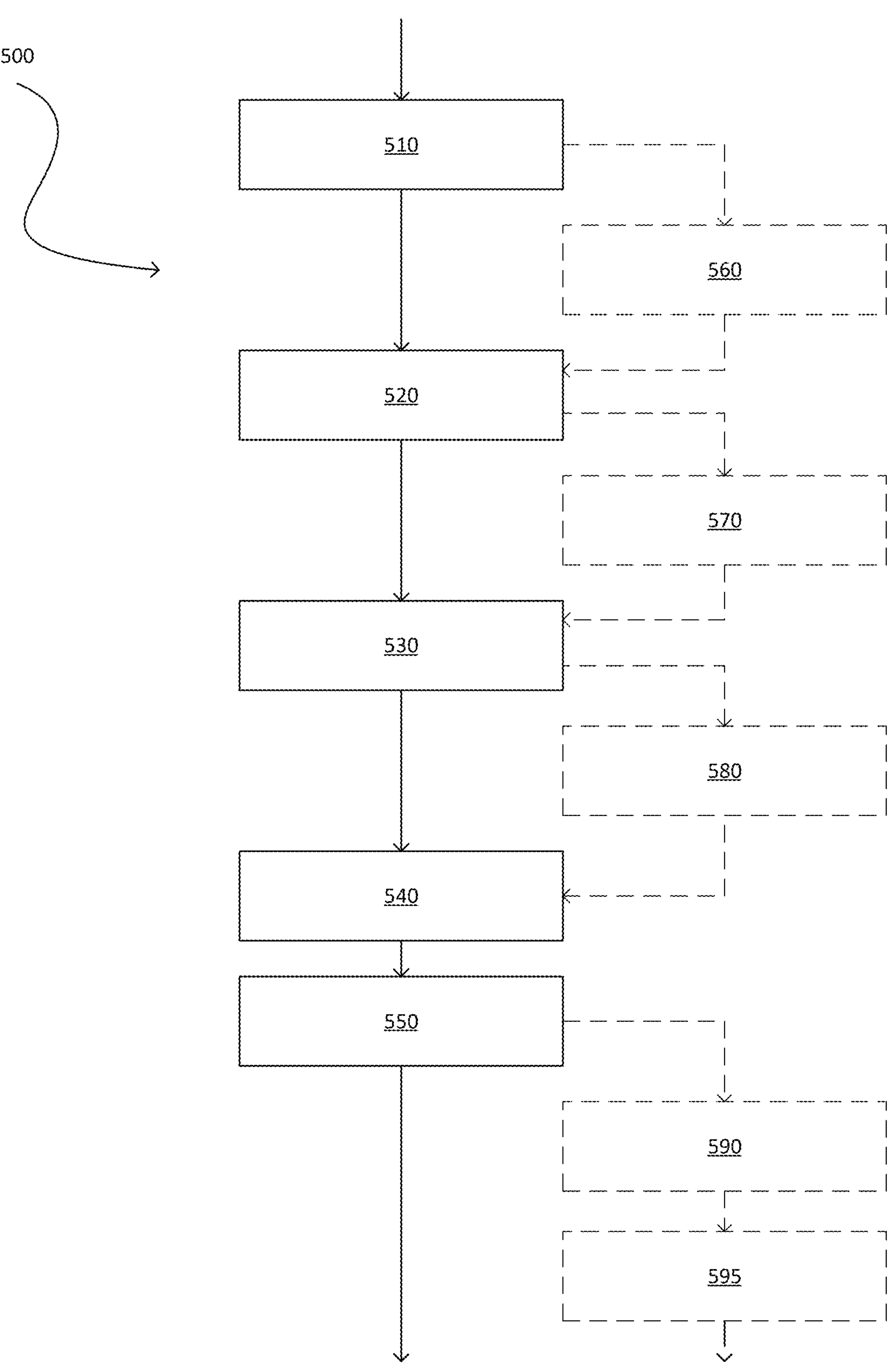
FIG. 3 schematically represents the interaction method according to the present disclosure.

Referring to FIG. 3, the present disclosure relates to a method 500 for enabling an expert user to guide an operator user through the immersion environment. This method takes into account the absence of knowledge by the assistance system of digital information relating to the immersion environment and interprets the guiding actions of the expert on the basis of what the operator sees and not on knowledge of the immersion environment.

During a first orientation step 510, the expert attracts the operator's attention to an area located outside his field of view. For this purpose, the expert carries out a pointing action in the peripheral region 3111 of the main window 311, said pointing action being carried out by a pointer which, depending on the nature of the assistance system, could be a mouse arrow in the case of a computer to which a mouse, one or several finger(s) in the case of a touch surface or any other suitable pointer is connected. The dimension of the peripheral region should be sufficient to enable the expert to handle the pointer in this region without any particular discomfort or difficulty.

By "pointing", it should be understood the positioning of a pointer on the expert interface and the "activation" of this pointer. As a non-limiting example, a pointer is the arrow of a mouse and the activation corresponds to exerting pressure on the button of the mouse. The pointer may also be a finger of the expert, and the activation is done by contact between a touch surface and the finger. The pointing action stops when the button of the mouse is released, in the first case, or when the expert moves his finger away from the touch surface in the second case.

Advantageously, such a pointing action activated in the peripheral region 3111 of the main window 311 could be carried on outside the peripheral region 3111 in the central region 3110 and produce the same effects as long as said pointing action does not cease.

The pointing action carried out by the expert makes at least one orientation marker 2300, indicating to the operator in which direction he should orient his head, appear on the operator interface 210 of the immersive system 20. Advantageously, the at least one orientation marker 2300 may be positioned in his peripheral field of view, in order not to interfere with his foveal vision.

As a non-limiting example, the at least one orientation marker may for example be an arrow or a blob-type indicator.

Figure 4:
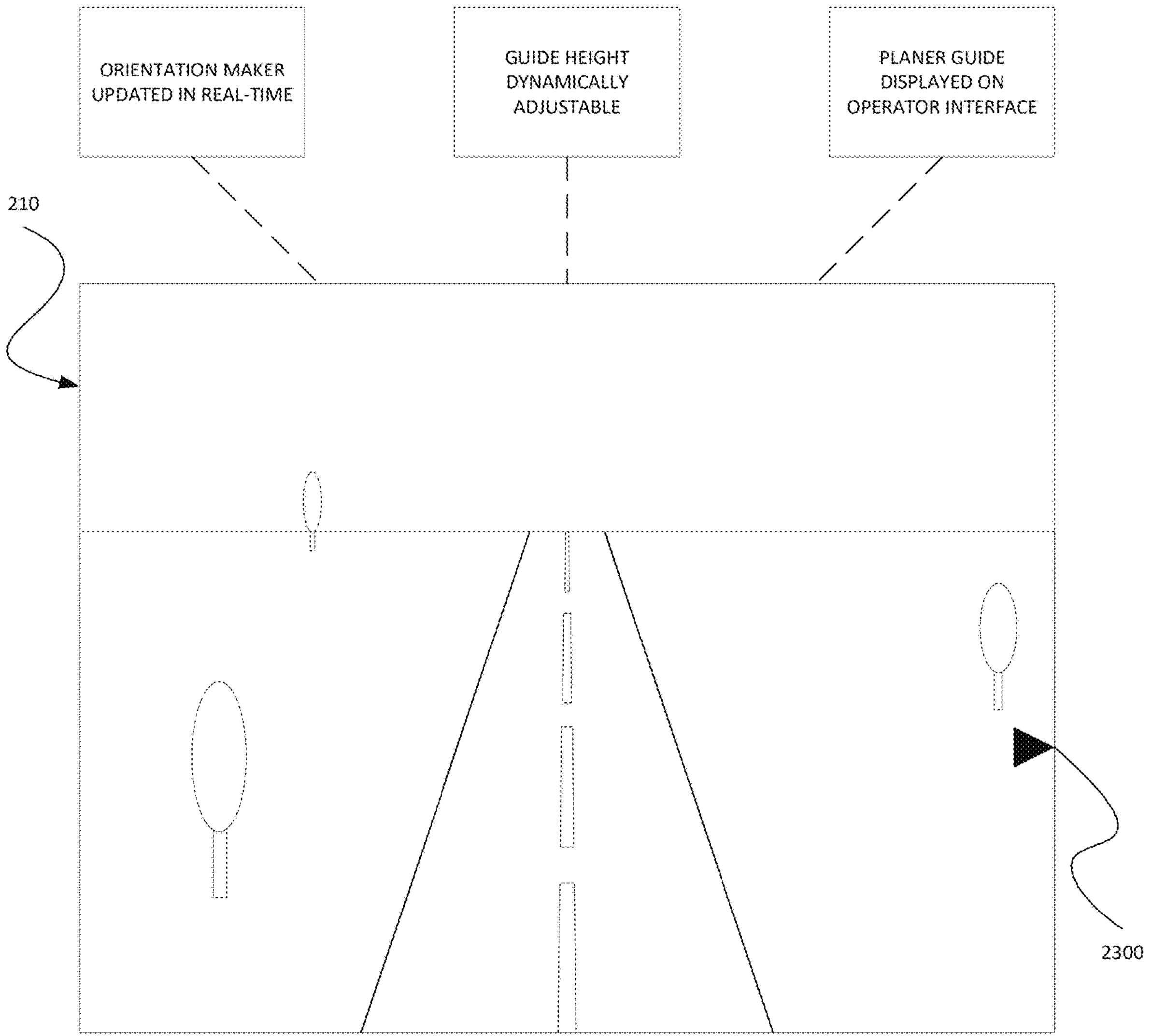
FIG. 4 represents a field of view of the operator in which appears an orientation marker.

FIG. 4 illustrates an orientation marker 2300 indicating the operator to orient to the right.

It should be noted that the operator software application 200 and the expert software application 300 knowing the position and direction of observation of the operator in a reference frame of the immersive system 20, it is therefore possible to take into account and compensate for the movements made by the operator during the orientation step 510 or any step of the method 500. In particular, the direction indicated by the at least one orientation marker 2300 depends on the pointing action of the expert and the evolution of the direction of the operator's gaze and evolves, both at the operator interface 210 and at the expert interface 310.

The indicated direction also takes into account the zooming level applied to the main window 311 of the expert interface 310.

Characteristics of the at least one orientation marker may vary according to the parameters which are the time, the position of the pointing action of the expert, the direction of the operator's gaze.

In particular, the at least one orientation marker 2300 could tend towards transparency as the direction of observation of the operator's head approaches the region of interest. Its appearance could also be a function of expert interactions, such as the selection of one depiction amongst others via buttons.

Like all markers described later on in the description, the at least one orientation marker 2300 could also be animated to take advantage of the eye's sensitivity to movement.

The position of the orientation marker 2300 in the operator interface 210 is updated in real-time according to the position of pointing by the expert step 560 and the evolution of the direction of observation of the operator.

The at least one orientation marker 2300 may also disappear as soon as the expert stops the pointing action, or else disappear after a predefined time period after the pointing action has ceased by the expert.

Once the operator is properly oriented, the expert indicates during a movement step 520 a 3D point to which the operator should move in the immersion environment.

It is herein reminded that the immersion environment is unknown to the assistance system 30.

Hence, the assistance system 30 is based on the coordinate system provided by the immersive system 20 and assumes that the ground is at a guide height, for example equal to zero, in this coordinate system.

In one implementation, the guide height is a predetermined and static absolute height in the coordinate system of the immersion environment of the immersive system, for example substantially equal to zero in said coordinate system.

In an alternative implementation, the guide height is a predetermined and static relative height in the system of coordinates of the immersion environment of the immersive system, for example equal to an average height of the eyes of the operator, shifted by an offset.

In an alternative implementation, the guide height is dynamically adjustable by the expert, in particular to adapt the movement of the operator to the specificities of the immersion environment of the operator retransmitted on the expert interface 310 of the expert, for example the presence of a difference in height in the immersion environment (planar guide is displayed with adjustable guide height on the operator interface step 570).

In one implementation, the floor of the operator in the immersion environment is considered to be the physical or real floor of the operator, the coordinates of which could be determined by the immersive system during a preliminary calibration phase.

Moreover, since the assistance system 30 knows at all times the position and the orientation of the operator's head, it is possible to determine a plane corresponding to a simulated ground, and display it in three dimensions in the main window 311 of the expert interface 310 in the form of a planar guide 2311, at the given guide height considered as an assumption, statically, or dynamically adjusted. In one embodiment, the planar guide is visually represented in the form of a grid. In another embodiment, possibly combined with the previous one, the plane-type guide is visually represented in the form of a transparent plane. The planar guide could also be visually represented as a textured plane.

The planar guide 2311 is integrated in 3D into the immersion environment of the operator and takes into account the observation conditions of the operator, namely the position and orientation of the head.

Thus, the expert could carry out a pointing action on the planar guide, which will make a movement marker 2310 which could be positioned by the expert and which will be attached to the planar guide when the expert stops pointing. Thus, the movement marker indicates to the operator where to move.

Figure 5A:
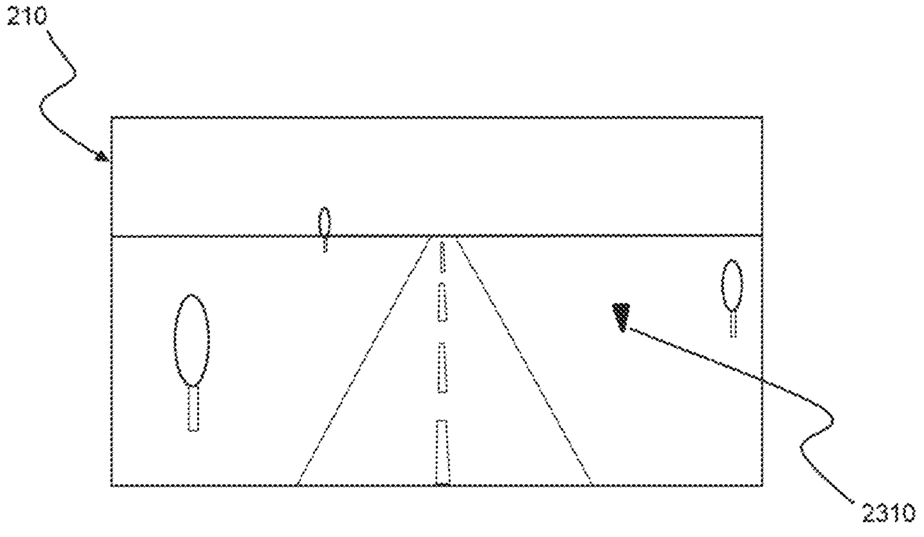
FIG. 5A represents a field of view of the operator in which appears a movement marker.
Figure 5B:
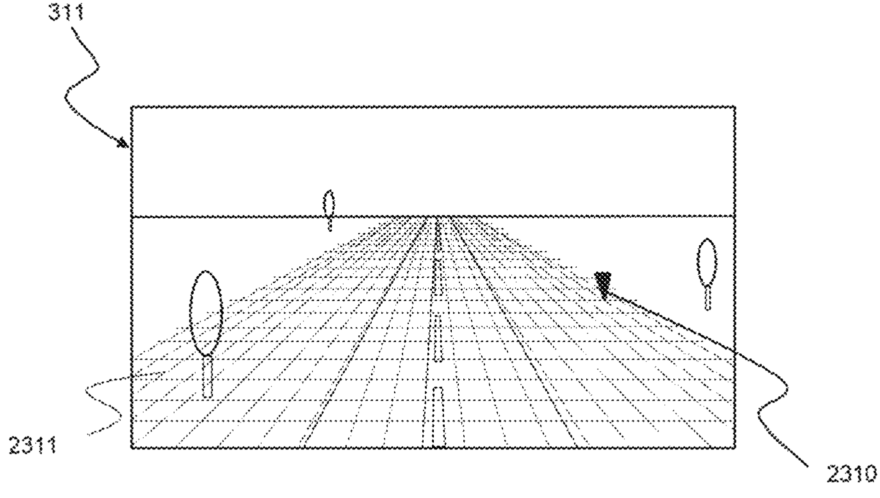
FIG. 5B represents a view of the main window of the expert interface in which a movement marker and a planar guide appear to assist with the positioning of the movement marker.

FIGS. 5A and 5B illustrate a movement marker appearing respectively on the operator interface and on the expert interface.

If the movement marker and/or the pointed position in the main window 311 of the expert interface 310 is not above the ground simulated by the planar guide 2311, it is possible to determine a projection of the pointed point on the planar guide 2311 (for example according to a plane symmetrical to the plane of the ground according to the position of the user, or according to the projection of a sphere on the ground).

Advantageously, the movement marker is displayed in the field of view of the operator as soon as the expert carries out a pointing action, so that the operator is able to follow the movements made by the expert before the latter drops the movement marker on the ground by ceasing the pointing action.

Advantageously, during this step, the depiction of the field of view of the operator is "frozen", i.e. the depiction of the field of view of the operator is no longer updated on the expert interface 310. The "freezing" of the depiction of the field of view of the operator could begin only when the expert carries out the pointing action.

The movement marker disappears after an action of the operator or the expert, and/or after a determined time period, for example comprised between one second and five seconds.

The planar guide could be materialized on the operator interface 210 as well as on the expert interface 310, partially (for example locally around the movement marker and/or pointer) or totally (for example a grid superimposed on the visualization of the image of the operator. The planar guide could also not be materialized. Referring to FIGS. 5B and 6B, the planar guide is displayed on the expert interface.

Characteristics of the movement marker and/or of the planar guide could vary according to the parameters which are the time, the position of the pointer during the pointing action, the direction of the operator's gaze. In particular, the marker and/or the planar guide could be displayed in transparency.

Preferably, the movement marker and the planar guide are displayed without transparency on the expert interface, and with transparency on the operator interface, to reduce the feeling that the movement marker is placed on the immersion environment of the operator, and clearly highlight that it is placed on a simulated ground which could be different from the ground of the immersion environment.

In an alternative implementation, it is also possible to place several movement markers in order to determine a trajectory to be followed by the operator. In this implementation, the duration of display of the movement markers may be extended in order to enable plotting of this trajectory.

Figure 6A:
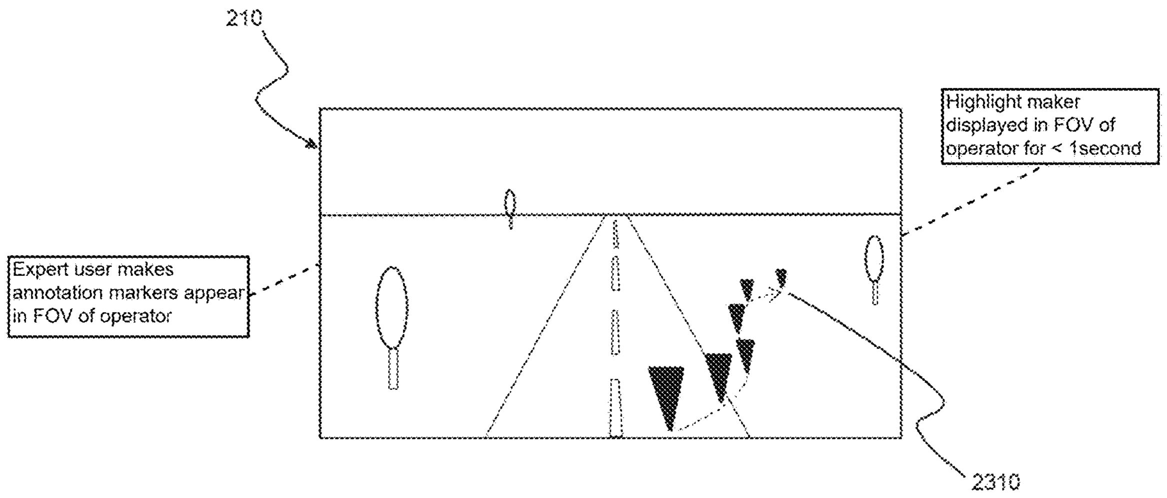
FIG. 6A represents a field of view of the operator in which appears a set of movement markers defining a trajectory.
Figure 6B:
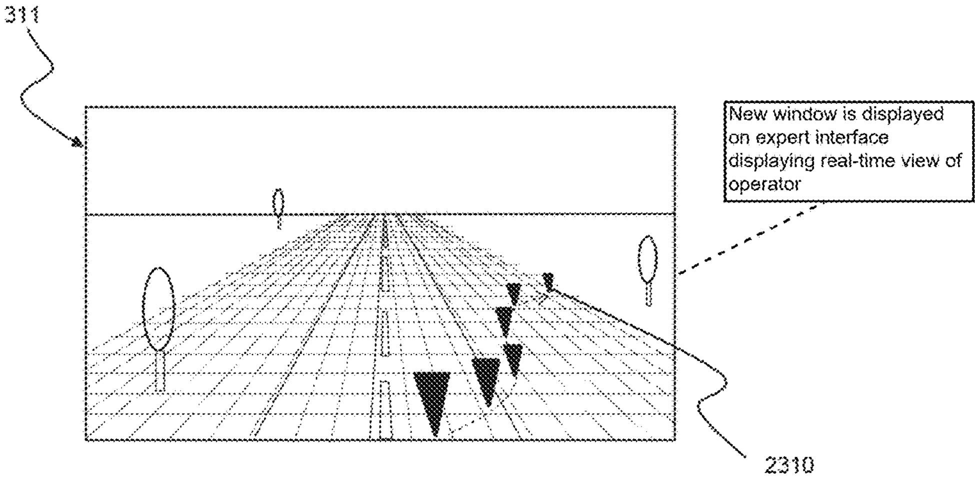
FIG. 6B represents a view of the main window of the expert interface in which appear a set of movement markers defining a trajectory and a planar guide to assist with the positioning of the movement marker.

FIGS. 6A and 6B illustrate such an implementation. In these figures, the set of the movement markers draws a trajectory symbolized in the figures by an arrow in a broken line, which is represented in the figures for clarity and good understanding, but does not necessarily appear in practice on the operator and/or expert interfaces.

Once the operator is properly positioned, the expert attracts the attention of said operator, during a highlighting step 530, to a particular element of the immersion environment. For example, the particular element may be an object or a group of objects.

For this purpose, the expert carries out a one-time pointing action on the particular element appearing on the expert interface. By "one-time pointing", it should be understood a pointing action for which the activation of the pointer and the cessation of the pointing action are carried out in a very short time interval, corresponding substantially to a pulse. For example, this corresponds to a simple "click" with a mouse or to a brief pressure with the finger in the case of a touch surface.

This one-time pointing action makes a highlight marker appear temporarily. In an advantageous implementation, the duration of appearance of the highlight marker is brief, for example half a second or one second, to take advantage of the eye's sensitivity to movement step 580.

Once the operator's attention has been attracted to the particular element, the expert communicates to the operator a first explanation relating to the particular element during a first annotation step 540.

For this purpose, the expert carries out an activation of the pointer and moves the pointer while keeping it active. For example, the expert may surround the particular element by positioning his finger on a touch surface proximate to said particular element, and circle this particular element while keeping the finger pressed on the touch surface.

It should be noted that, conventionally, the collaborative immersion device 10 could include communication means enabling the operator and the expert to talk to each other. The annotations enable the expert to highlight a particular element of the immersion environment of the operator, and could complement such communication means step 590.

During the first annotation step 540, the depiction of the field of view of the operator is frozen on the expert interface 310, as long as the pointer is active, to enable the expert to proceed with the annotation and make at least one annotation marker appear.

The at least one annotation marker appears temporarily, for example for half a second.

The advantage of relatively short display times for the markers of the highlighting step 530 and the first annotation step 540 compared to the previous steps of the method according to the present disclosure, is that they allow taking advantage of the increased sensitivity of human vision to movement. These highlight and annotation markers allow attracting the attention of the operator effectively, and they are supplemented by the other markers created during the other steps of the method according to the present disclosure, which are more persistent and are actually carried out on a persistent medium.

Afterwards, a second annotation step 550 is implemented during which the expert provides the operator with details relating to the particular element.

During this second annotation step 550, the depiction of the field of view of the operator is frozen on the expert interface 310, thus enabling the expert to make additional annotation markers. Unlike the first annotation step 540 for which the depiction is frozen only during the pointing action time, during the second annotation step 550, the depiction of the field of view of the operator is frozen as long as the expert does not voluntarily leave this annotation mode and/or as long as a predefined freeze time has not elapsed.

The image supporting the annotations of the expert, itself being a capture of the field of view of the operator, could be transmitted and then displayed on the operator interface 210 so that it occupies the field of view of the operator at least partially. Advantageously, its display may correspond to the known projection characteristics of the real or virtual camera of the user and thus retain the operator's perspective as much as possible. It may also be just an image displayed at a predetermined position and orientation in the field of view of the operator, for example always at the bottom left and always oriented towards the operator, or at a fixed position and orientation in the immersion environment of the operator, for example at a fixed distance and in the line of sight of the targeted particular element. A person skilled in the art should understand that the position and the orientation of the visual depiction of the support image of the annotations are not limited to the examples described hereinbefore, and in particular may vary according to the orientation of the operator in the immersion environment; the image could also be handled by the operator and/or the expert and evolve in the immersion environment with inertia compared to the movements of the operator.

Depending on the embodiments, other characteristics of the visual depiction of the support image in the immersion environment could vary, such as its transparency or the frame that surrounds it, the latter may for example be non-existent or on the contrary particularly marked to better mark its presence.

The support image of the annotations of the expert being thus visible to the operator, the annotations made by the expert on this image are transmitted to the operator so that he can view them on their support. In an optimum embodiment, these annotations are transmitted continuously, as soon as they are made by the expert, to support the exchange.

Hence, the operator can follow the annotations made by the expert in real-time.

The end of the second annotation step could be done by closing the frozen view by the expert, closing the support image by the operator, or by "unfreezing" the frozen view, the events of the end of this second annotation step could be synchronous or asynchronous between the expert and operator interfaces. Complementarily, closing the support image by the operator may result from a direct interaction of the operator (action on a button for example) or an indirect action of the operator (for example movement of his controls within the depiction of the support image).

Advantageously, a new window could be displayed on the expert interface to display the operator's view in real-time step 595. For example, this new window may be a medallion, or a thumbnail window displayed in a corner of the main window.

In one implementation, the end of the second annotation step could be done by enlarging the real-time view to full screen.

It should be noted that, to the extent that the markers created during the method according to the present disclosure are displayed in the field of view of the operator, which is displayed on the expert interface, the markers will actually appear on the expert interface and it is not necessary to specifically create in the expert software application 300 markers intended for the expert interface, the expert software application 300 could nonetheless provide for the visualization of these markers.

It should also be noted that the present disclosure implements markers of different natures, namely in particular manual annotations (annotations drawn by hand to highlight a particular element or a region of the field of view of the operator), symbolic annotations (annotations resulting from the placement of known and meaningful symbols, such as an arrow, to highlight in a clearly identified manner elements or regions of the field of view of the operator, or such as the movement marker) and orientation markers. Although the method according to the present disclosure could be implemented at least partly thanks to a set of buttons allowing switching from one marker type to another, an expert interface 310 as described hereinabove is advantageously used, and which is divided into a region in which the pointing actions are interpreted as manual or symbolic annotations or as movement markers, and a region in which the pointing actions will lead to the creation of movement markers. Advantageously, these regions respectively correspond to a central region and to a peripheral region, as described hereinabove, and the peripheral region could be associated with a blur, in order to simulate a central vision and a peripheral vision.

For example, a pointing action in the peripheral region 3111 leads for example to the creation of an orientation marker, and a pointing action in the central region 3110 to the creation of a movement marker. For example, a button-type interface element 312 may enable changing the interpretation of a pointing action in the central region, which may be interpreted after a click on the button as an annotation.

The expert software application could also interpret the end of the orientation step 510, i.e. a proper orientation of the operator's head, as the switch into the movement step 520, and thus associate the following pointing action(s) with movement markers, until the end of the movement step 520.

Similarly, the end of the first annotation step 540 could be interpreted by the software application as the switch to the second annotation step 550, and therefore associate the upcoming pointing actions as more persistent annotations than those associated with the first annotation step, until the end of the second annotation step.

Hence, the present disclosure allows interpreting the interactions of the expert guiding the operator with regards to what the operator sees in his immersion environment and not with regards to knowledge of the immersion environment.

Moreover, a segmentation of the expert interface allows simplifying the interpretation by the expert software application of the pointing actions of the expert, and thus switching from one marker type to another while limiting the number of operations to be carried out by the expert.

Of course, the present disclosure is not limited to the embodiments and implementations detailed hereinabove. In particular, the present disclosure could apply to more than one operator and/or more than one expert, the associated immersive and assistance systems could be connected to the same central unit, or on the contrary be remote and connected to each other by various data transmission means, for example a network connection.

Also, the movement markers, the planar guide, and the annotation markers are advantageously dynamic markers whose characteristics, in particular the size and the position, could evolve according to the movement of the operator and/or his position of observation and/or its direction of observation. For example, the movement marker may be enlarged as the operator approaches it in the immersion environment.

Similarly, the various steps of the method 500 may also be implemented in a different order than that in which they are described herein, or may be skipped if these are not necessary. For example, the highlighting step 530 may be skipped if the particular element obviously appears to the operator because of its size.

What is claimed is:

1. A method for interaction between at least one operator user of an immersive system, said at least one operator user being immersed in an immersion environment a depiction of which said at least one operator user views on an operator interface, and at least one expert user of an assistance system including an expert interface and at least one pointing tool configured to interact with the operator interface, said expert interface displaying a visual depiction of a field of view of the at least one operator user of the immersive system and including a main window divided into at least two distinct continuous contiguous regions including a region in a rectangular shape, a peripheral region in the form of a frame and configured so that a pointing action is interpreted in at least two different manners, said method comprising:

an orientation step during which the at least one expert user orients a gaze of the at least one operator user by making at least one orientation marker appear in the field of view of the at least one operator user by carrying out at least one pointing action, over the peripheral region of the expert interface, by means of the at least one pointing tool on the expert interface, in order to attract the attention of the at least one operator user to a region of interest of the immersion environment, a movement step during which the at least one expert user provides an indication of movement to the at least one operator user by making at least one movement marker appear in the field of view of the at least one operator user by carrying out at least one pointing action on the expert interface, wherein during the movement step, the expert interface displays, in the main window, a planar guide corresponding to a simulated ground plane determined based on a position and an orientation of the at least one operator user, and wherein the at least one pointing action is carried out on the planar guide such that the movement marker is attached to the planar guide when the pointing action ceases, wherein said at least one pointing action of the movement step is carried out within said region in the rectangular shape.

2. The method according to claim 1, wherein the at least one orientation marker remains visible in the field of view of the at least one operator user as long as the at least one expert user carries out the at least one pointing action.

3. The method according to claim 1, wherein the at least one orientation marker disappears automatically within a predefined time period after the at least one expert user has stopped the at least one pointing action.

4. The method according to claim 1, wherein the at least one orientation marker is updated in real time according to the at least one pointing action carried out by the at least one expert user.

5. The method according to claim 1, wherein during the movement step, a planar guide is determined by the assistance system, based on a coordinate system provided by the immersive system and on an assumption that a floor of the immersion environment is at a guide height in said coordinate system, said planar guide being displayed on the expert interface to enable the at least one expert user to carry out the at least one pointing action.

6. The method according to claim 5, wherein the guide height is dynamically adjustable by the at least one expert user.

7. The method according to claim 6, wherein the planar guide is a grid or a transparent plane or a textured plane.

8. The method according to claim 6, wherein the planar guide is displayed on the operator interface.

9. The method according to claim 1, wherein during the movement step the at least one expert user proceeds with a plurality of pointing actions in order to make a trajectory appear in the field of view of the at least one operator user.

10. The method according to claim 1, wherein during the movement step a depiction of the field of view of the at least one operator user on the expert interface is frozen.

11. The method according to claim 1, wherein a movement marker created during the movement step disappears after a time period of one to five seconds after the at least one expert user has stopped a pointing action creating said movement marker.

12. The method according to claim 1, further comprising a highlighting step during which the at least one expert user attracts the attention of the at least one operator user to a particular element of the field of view of the at least one operator user by means of at least one highlight marker created by carrying out a one-time pointing action.

13. The method according to claim 12, wherein the at least one highlight marker is displayed in the field of view of the at least one operator user for a period of less than one second.

14. The method according to claim 1, further comprising a first annotation step, during which the at least one expert user makes at least one annotation marker appear in the field of view of the at least one operator user.

15. The method according to claim 14, wherein during the first annotation step, a depiction of the field of view of the at least one operator user is frozen on the expert interface.

16. The method according to claim 14, wherein the at least one annotation marker is displayed in the field of view of the at least one operator user for a period of less than one second.

17. The method according to claim 14, further comprising a second annotation step during which the at least one expert user makes annotation markers appear in the field of view of the at least one operator user.

18. The method according to claim 17, wherein during the second annotation step a depiction of the field of view of the at least one operator user on the expert interface is frozen.

19. The method according to claim 18, wherein the depiction of the field of view of the at least one operator user is frozen as long as the at least one expert user does not leave an annotation mode or as long as a predefined freezing time period has not elapsed or as long as the at least one operator user does not leave a mode.

20. The method according to claim 17, wherein a new window is displayed on the expert interface to display a real-time view of the at least one operator user.

21. A collaborative immersion device comprising an immersive system, an assistance system, data transmission means between said immersive system and said assistance system, the immersive system including an operator software application implementing an operator interface and a digital processing system, the assistance system including an expert software application implementing an expert interface and a digital processing system, said expert interface displaying a visual depiction of a field of view of an operator user immersed in said immersive system, the collaborative immersion device further including at least one pointing tool and in that the expert interface includes a main window divided into at least two distinct continuous contiguous regions including a region in a rectangular shape, a peripheral region in the form of a frame and configured so that a pointing action is interpreted in at least two different manners, depending on whether the pointing action is carried out in either one of the at least two distinct contiguous regions, to make at least one orientation marker and at least one movement marker appear on the operator interface, wherein the expert interface displays, in the main window, a planar guide corresponding to a simulated ground plane determined based on a position and an orientation of the at least one operator user, and wherein the pointing action is carried out on the planar guide such that the at least one movement marker is attached to the planar guide when the pointing action ceases, wherein said pointing action for making the at least one movement marker is carried out within said region in the rectangular shape.

22. The device according to claim 21, wherein the digital processing system of the immersive system and the digital processing system of the assistance system form a single and unique digital processing system.

23. The device according to claim 21, wherein at least one of the at least two distinct contiguous regions is blurred on the expert interface.

24. The device according to claim 21, wherein the main window includes two distinct regions, a rectangular-shaped central region, placed in a center of said main window, and a peripheral region surrounding said rectangular-shaped central region.

25. The device according to claim 24, wherein a pointing action in the rectangular-shaped central region makes a marker appear on the operator interface, and in that a pointing action in the peripheral region surrounding said rectangular-shaped central region makes a marker or an annotation appear.

26. The device according to claim 21, wherein the expert interface includes at least one interface element allowing modifying an interpretation of a pointing action in at least one of the at least two distinct contiguous regions.

27. The device according to claim 21, wherein the at least one pointing tool includes a mouse or a touch surface.

* * * * *